United States Patent
Hütter

(10) Patent No.: US 8,195,828 B2
(45) Date of Patent: Jun. 5, 2012

(54) METHOD FOR DISCONTINUOUS TRANSMISSION, IN SECTIONS, OF DATA IN A NETWORK OF DISTRIBUTED STATIONS, AS WELL AS A NETWORK SUBSCRIBER STATION AS A REQUESTING APPLIANCE FOR CARRYING OUT A METHOD SUCH AS THIS, AND A NETWORK SUBSCRIBER STATION AS A SOURCE APPLIANCE FOR CARRYING OUT A METHOD SUCH AS THIS

(75) Inventor: Ingo Hütter, Pattensen (DE)

(73) Assignee: Thomson Licensing, Boulogne-Billancourt (FR)

( * ) Notice: Subject to any disclaimer, the term of this patent is extended or adjusted under 35 U.S.C. 154(b) by 1152 days.

(21) Appl. No.: 10/988,094

(22) Filed: Nov. 12, 2004

(65) Prior Publication Data

US 2005/0120132 A1   Jun. 2, 2005

(30) Foreign Application Priority Data

Nov. 14, 2003   (DE) .................................. 103 53 564

(51) Int. Cl.
*G06F 15/16* (2006.01)
(52) U.S. Cl. .................. 709/231; 709/219; 709/228
(58) Field of Classification Search .............. 709/219, 709/228, 231
See application file for complete search history.

(56) References Cited

U.S. PATENT DOCUMENTS

| | | | | |
|---|---|---|---|---|
| 5,909,238 A * | 6/1999 | Nagashima et al. | ............... | 725/8 |
| 5,922,048 A * | 7/1999 | Emura | ............................ | 725/88 |
| 6,065,050 A * | 5/2000 | DeMoney | ..................... | 709/219 |
| 6,097,422 A * | 8/2000 | Aref et al. | ........................ | 725/94 |
| 6,128,653 A * | 10/2000 | del Val et al. | ................. | 709/219 |
| 6,141,358 A * | 10/2000 | Hurst et al. | ................... | 370/543 |

(Continued)

FOREIGN PATENT DOCUMENTS

EP   1271350   1/2003

(Continued)

OTHER PUBLICATIONS

Sustainability of Digial Formats Planning for Library of Congress Collections. ASF (Advanced Systems Format). Retrieved from internet on Mar. 14, 2008: <http:///www.digitalpreservation.gov/formats/fdd/fdd000067.shtml.].*

(Continued)

*Primary Examiner* — Aaron Strange

(74) *Attorney, Agent, or Firm* — Robert D. Shedd; Jeffrey M. Navon; Jerome G. Schaefer

(57) ABSTRACT

When data streams are being transmitted in a network of distributed stations (10, 20) in which the network subscriber stations are controlled on the basis of the Internet Protocol, a resource (such as a file) can very often be transmitted using the HTTP-GET method. However, this does not support discontinuous transmission, in sections, of data, as is required, for example, in the case of trick modes (search processes) for a video film. The invention describes an extension to the known HTTP-GET method, such that this application is likewise possible. For this purpose, additional parameters relating to the required search are transmitted to the source appliance (10) in the HTTP-GET request. The source appliance (10) then sends the respective data sections for the search.

12 Claims, 4 Drawing Sheets

U.S. PATENT DOCUMENTS

| | | | |
|---|---|---|---|
| 6,272,535 B1 * | 8/2001 | Iwamura | 709/217 |
| 6,434,319 B1 * | 8/2002 | Wine | 386/46 |
| 6,449,653 B2 | 9/2002 | Klemets et al. | |
| 6,604,144 B1 * | 8/2003 | Anders | 709/231 |
| 7,317,903 B2 * | 1/2008 | Omori et al. | 455/127.3 |
| 2001/0013128 A1 * | 8/2001 | Hagai et al. | 725/90 |
| 2002/0141740 A1 * | 10/2002 | Matsui | 386/111 |
| 2003/0004992 A1 * | 1/2003 | Matsui et al. | 707/512 |
| 2003/0009537 A1 | 1/2003 | Wang | |
| 2003/0093801 A1 * | 5/2003 | Lin et al. | 725/90 |
| 2003/0140159 A1 * | 7/2003 | Campbell et al. | 709/231 |
| 2005/0010531 A1 * | 1/2005 | Kushalnagar et al. | 705/59 |
| 2006/0037057 A1 * | 2/2006 | Xu | 725/90 |

FOREIGN PATENT DOCUMENTS

| | | |
|---|---|---|
| JP | 2002543705 | 12/2002 |
| JP | 2003108414 | 4/2003 |
| JP | 2003177980 | 6/2003 |
| WO | WO0067469 | 11/2000 |
| WO | WO 03/028293 A1 | 3/2003 |

OTHER PUBLICATIONS

Fielding, et al. Hyper Transfer Protocol—HTTP/1.1. [Retrieved from internet on Mar. 14, 2008: <http://www.w3.org/Protocols/rfc2616/rfc2616-sec3.html>].*

The TCP/IP Guide. HTTP Data Length Issues, "Chunked" Transfers and Message Trailers. [Retrieved from internet on Mar. 14, 2008: <http://www.tcpipguide.com/free/t_HTTPDataLengthIssuesChunkedTransfersandMessageTrai-2.htm>].*

Bos et al., "A Framework for End-to-End User Perceived Quality of Service Negotion", Internet Draft, Nov. 2001, pp. 1-20.

Hutter, "Development of a DVD Player: Problems and Solutions", Fernseh-Und Kino-Technik 53, Jahrgang Nr, Nov. 1999.

Handley et al., "SIP: Session Initiation Protocol", Network Working Group, Standards Track, 1999.

"Overview of UPnP AV Architecture", Intel Research and Development, Jul. 2, 2003.

Lin et al., "MPEG Video Streaming with VCR Functionality", 2000 IEEE, 2000.

* cited by examiner

Get/item/MenInBlack.mpg HTTP/1.1
Host:www.my.server
AV_SPEED: forward_3
AV_STARTTIME: 01.02.03.02

IBBPBBPBBPBBIBBPBBPBBPBBIBBPBBPBBPBBIB...
IPPPIPPPIPPP...
3 X FF                    Fig.4

HTTP Response

HTTP/1.1 210 Trickmode OK
Date: Fri, 31 Dec 2003 17:59:59 GMT
Content-Type: video / mpeg
Transfer-Encoding: chunked
1EAE0; time =01:02:03:04
I - Frame-Data
0CE5B; time =01:02:03:07
P - Frame-Data
0AB3A; time =01:02:03:10
P - Frame-Data
:
0

GET / item?name = MenInBlack&speed=forward_3&time=01.02.03.02 HTTP/1-1
HOST: www.my.server

METHOD FOR DISCONTINUOUS TRANSMISSION, IN SECTIONS, OF DATA IN A NETWORK OF DISTRIBUTED STATIONS, AS WELL AS A NETWORK SUBSCRIBER STATION AS A REQUESTING APPLIANCE FOR CARRYING OUT A METHOD SUCH AS THIS, AND A NETWORK SUBSCRIBER STATION AS A SOURCE APPLIANCE FOR CARRYING OUT A METHOD SUCH AS THIS

This application claims the benefit, under 35 U.S.C. 119, of German patent application No. 10353564.0 filed 14 Nov. 2003.

FIELD OF THE INVENTION

The invention relates to the technical field of data transmission in a network of distributed stations, in particular in a so-called domestic network. In this case, the data is transmitted discontinuously, in sections.

BACKGROUND TO THE INVENTION

Various domestic network standards have recently become available for the networking of appliances in the domestic area.

A consortium of companies, in particular companies in the computer industry, led by Microsoft, have started an initiative for the specification of a network control software based on the existing Internet Protocol (IP). This network system has become known by the abbreviation UPnP (Universal Plug and Play). In this system, the specification does not relate primarily to entertainment electronic appliances and, in fact, other appliances can also be integrated in the network, in particular personal computers, domestic appliances in the white goods range, such as refrigerators, microwave cookers, washing machines, as well as heating controllers, lighting controllers, alarm systems and so on.

A working group of the UPnP forum have worked out the UPnP-AV specification, which builds on the general UPnP specification and extends it, for application of the UPnP method to AV appliances. In order to transfer AV data (audio/video data) in a domestic network such as this between a so-called server (source appliance) and a so-called renderer appliance (destination appliance), the UPnP-AV specification stipulates that known transmission protocols should be used for transportation of the data. The so-called HTTP-GET method (HTTP stands for Hyper Text Transfer Protocol) and, in addition, the so-called RTP method (RTP stands for Real Time Transport Protocol) are mentioned as known protocols in the specification. These two transport mechanisms are available when the network subscriber stations are linked to one another via Ethernet bus connections.

The HTTP-GET method is based on the TCP method (Transmission Control Protocol), which is a basic connection-oriented transport protocol, in which protected data transmission (with error correction) takes place. The TCP method is in turn built on the Internet Protocol (IP). The HTTP-GET method was developed especially for the transmission of files (for example HTML web pages) from a web server to a web browser. In consequence, it is not adapted for real-time data transmission in sections, for example as occurs on transmitting audio or video data streams. On the other hand, the HTTP-GET method is widely used and is designed to be very simple for the application programmer, so that it is widely popular.

The transport mechanism according to the RTP method is based on the UDP method (User Datagram Protocol), which is likewise built on the Internet Protocol, operates without any connection and does not use error correction, so that disturbances may occur when data is transmitted using this method. On the other hand, the RTP method is better suited to real-time data transmissions, because it uses intermediate buffers, additional time stamps and sequence numbers. In this respect, it is thus more suitable for transmission of audio or video information, particularly on the Internet, which is characterized by numerous bottlenecks.

The transport mechanism based on the HTTP-GET method is recommended for the transmission of AV data streams in the UPnP specification. The HTTP-GET method was intended primarily for requesting a resource which is available in the network, which in many cases is an existing file, and then to transmit this entirely in one piece to the destination appliances. In addition, the so-called chunked transfer encoding method was introduced in HTTP Version 1.1, as well, and this is intended to be used whenever a resource is to be transmitted whose overall length is not yet entirely known at the time when the transmission starts. In this case, the resource should be transmitted in sections but continuously (that is to say without any gaps).

SUMMARY OF THE INVENTION

Against the background of the described prior art, the object of the invention is to extend the transport mechanism based on the HTTP-GET method such that it is also possible to implement so-called trick modes in the transmission of data streams. Trick modes such as these include, for example in the case of AV data streams, fast forward (searching in the forward direction) and fast reverse (searching in the backward direction). The invention solves this problem by defining additional parameters for the HTTP-GET method which, for example, relate to the playback speed and playback direction, as well as to the initial position for the playback process.

Normally, only individual data blocks are required for the playback process in trick modes such as these, for example only individual video frames are reproduced during a fast forward search through a video film, and other video frames between the reproduced frames are suppressed. Effectively, this therefore results in repeated jumping from one video frame N to a video frame N+X (forward) or N−X (reverse). In order to carry out this discontinuous transmission of the data in sections, it is possible to send out the new type of HTTP GET request with the additional parameters such as, playback speed and playback direction, as well as the initial position for the playback process. The source device sends the requested data sections for the requested trick mode back with a HTTP Get response.

This invention makes it possible to use the simple transport mechanism HTTP-GET for implementation of trick modes for real-time data transmission as well, in particular for AV data. This invention likewise makes it possible to implement so-called navigation commands which, for example, allow a deliberate jump to a position in the data stream which occurs at a specific time or later, for example 15 minutes later than the current playing time.

The measures specified in the dependent claims allow advantageous developments and improvements of the method according to the invention.

One advantageous embodiment of the invention is to use the chunked transfer encoding mode in the HTTP-GET method. Specifically, a data section to be reproduced is always transmitted as a chunk. Also, in this case, the data is not transmitted continuously, that is to say without gaps, and, instead, there are other areas which are omitted between the individual transmitted data sections, that is to say this represents discontinuous data transmission, in sections. The time position of each chunk can also be indicated in a commentary line. This has the advantage of having more time accuracy when the current trick mode is stopped or interrupted by a new type of trick mode request.

As an acknowledgement that it has been possible to correctly interpret the parameters in the HTTP-GET request according to the invention, it is either possible to return an agreed special status code, or else the parameters can be repeated once again in the response. In the case of an appliance which is not designed according to the invention, the response would be different, so that the requesting appliance can emit suitable information to the operator if the addressed appliance does not support such trick mode reproduction.

Correspondingly advantageous measures for a network subscriber station as the requesting appliance for carrying out the method according to the invention are listed in claims 11 and 12.

Correspondingly advantageous measures for a network subscriber station as source appliance for carrying out the method according to the invention are listed in claims 13 to 18.

BRIEF DESCRIPTION OF THE DRAWINGS

Exemplary embodiments of the invention will be explained in more detail in the following description, and are illustrated in the drawings, in which:

FIG. 4 shows a schematic illustration illustrating, as an example, a triple speed search in the forward direction for MPEG2 coded video data;

DETAILED DESCRIPTION OF THE INVENTION

Figure 1:
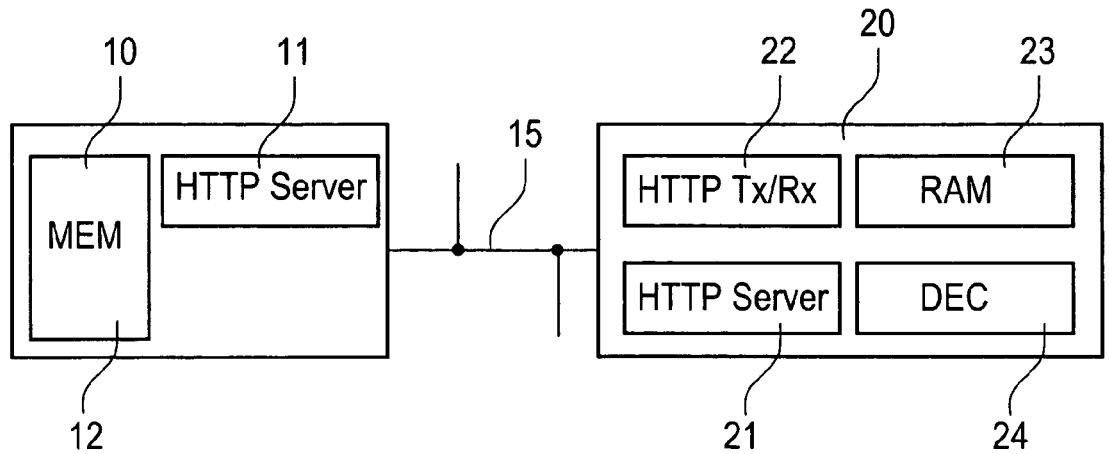
FIG. 1 shows rough block diagrams of a source appliance and destination appliance in a network of distributed stations.

FIG. 1 shows a source appliance 10 and a destination appliance 20 in a network of distributed stations. As illustrated, the individual network subscriber stations are intended to be connected to one another by means of Ethernet bus connections 15. It is also assumed that the individual network subscriber stations are designed to the UPnP Standard. The UPnP specification can be obtained from the company Microsoft.

Further information is also available on the official Internet site for the UPnP system. Reference should be made to the Internet site for this purpose.

The terminology for the source appliance corresponds to that for the UPnP system in a server. The terminology for the destination appliance 20 in the UPnP system corresponds to that for a renderer appliance, corresponding to the destination appliance. In the example illustrated in FIG. 1, the two major components of the source appliance 10 are the memory device 12 and the HTTP server 11, which are emphasized separately. Typical source appliances for audio/video data are, for example, DVD players, DVD recorders, hard disk recorders, DVHS recorders, CD players, MP3 players, video cameras or else a personal computer. The AV data which can be played back is stored in the memory device 13 in the source appliance 10. The HTTP server component 11 is essential for a UPnP appliance such as this according to the UPnP specification, and may be in the form of software. The corresponding program methods are known from the prior art, and reference should be made in particular to the UPnP specification with regard to the disclosure of these components.

The major components in the destination appliance 20 are an HTTP transmitter/receiver 22, an HTTP server 21, a buffer store 23, and decoding logic 24. Destination appliances 20 may, for example, be a digital television, which may also be in the form of a set-top box, DVD player, and MP3 player or else a personal computer. The decoding unit 24 must be designed as an MPEG2 decoder for transmission of MPEG2-coded video information. The buffer store 23 should preferably be in the form of a RAM memory unit.

Figure 2:
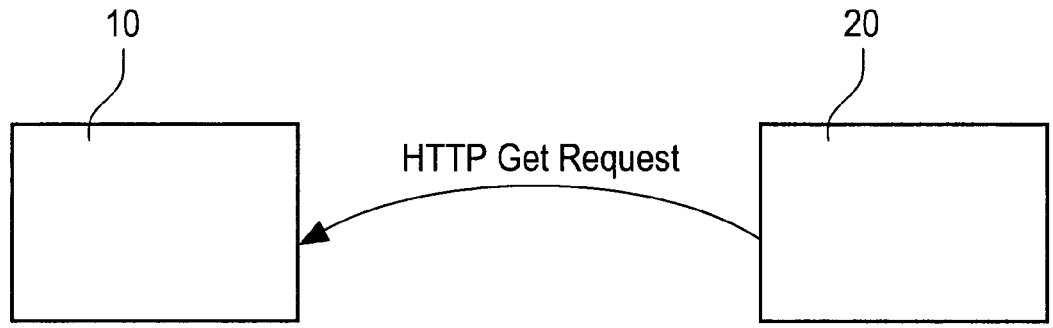
FIG. 2 shows the format of an HTTP-GET request according to the invention, which is sent from the destination appliance to the source appliance.
Figure 3:
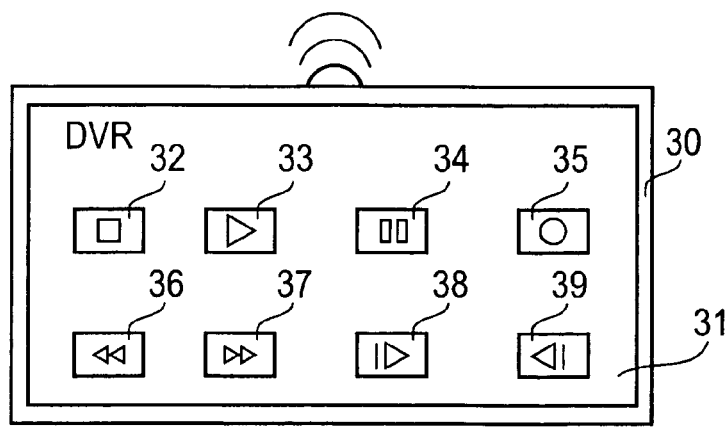
FIG. 3 shows an example of a universal remote control.

The following text is based on the assumption that a connection for data transmission of AV data has been set up between the source appliance and the destination appliance. It is also assumed that the source appliance 10 is playing back a video film at normal speed, and that the associated AV data stream is being transmitted continuously to the destination appliance 20 via the connection that has been set up. The user then requests a fast search in the forward direction on the destination appliance 20. As is shown in FIG. 3, this may be done using a remote control 30. By way of example, FIG. 3 shows a universal remote control which is equipped with a touch-screen display 31, on which the control functions for a digital video recorder are displayed. Universal remote controls such as these are known from the prior art. As an example, reference is made to the prior art of the European Patent Application EP A 0 780 990. The buttons which are shown on the display 31 are a stop button 32, a replay button 33, a pause button 34, a record button 35, a button for fast reverse 36, a button for fast forward 37, a button for a forward title jump 38 and a button for a reverse title jump 39. The operator has pressed the button 37 on the destination appliance 20 in order to request a fast forward search. This command is then converted by the destination appliance 20 to an appropriate HTTP GET request, which is transmitted via the network cable 15 to the source appliance. FIG. 2 shows the details of the structure of the HTTP GET request. In the example shown there, the requested file name follows the keyword GET. This is signaled by the parameter name ITEM. For example, the file name is MenInBlack.MPG, which corresponds to a typical name for a video film. The HTTP version details, on the same line, are followed on the next line by the details of the appliance in which this file can be found. In order to identify this parameter, the expression HOST precedes the server name in the second line. The server name shown in the example is given in FIG. 2. The next parameter, on the line following this, is the details of the playback speed. The parameter name is accordingly AV_SPEED. However, at the same time, this parameter also includes the playback direction. In the illustrated example, the parameter details comprise the expression Forward_3 which indicates that the intention is to carry out a fast forward search at three times normal speed. However, a separate parameter could additionally have been introduced for the playback direction.

The fourth line of the HTTP-GETrequest also includes the parameter details for the initial position of the requested search. The parameter name for this is AV_STARTTIME. The parameter name is followed by the position details 01.02.03.02, which indicate the current playing time position, specifically one hour, 2 minutes, 3 seconds, frame 02. An appropriate program is provided in the destination appliance 20 for creation of the HTTP-GET request, which is initiated by requesting the search process by pushing the button 37. This will also be explained in more detail in the following text.

FIG. 4 now shows the requested search process at three times the playback speed in the forward direction, in more detail. The illustration shows the display sequence of digitally coded video frames, with the digital video frames being coded on the basis of the MPEG2 Standard. This Standard draws a distinction between intracoded frames (I frames), bidirectional coded frames (B frames) and unidirectional coded frames (P frames). The highest data compression rate is used for B frames, followed by the P frames. The intracoded frames are the least compressed, but can also be used as support frames, that is to say their frame content can be reconstructed without any knowledge of a previous or subsequent frame. A sequence of frames in the MPEG2 Standard is recommended as a so-called Group of Pictures (GOP), in the form: IBBPBBPBBPBB. FIG. 4 shows three successive Groups of Pictures such as this. The procedure for carrying out a triple speed search in the forward direction is now as follows: only the I frames and the P frames of the Groups of Pictures are reproduced. Four different frames can thus be displayed from a Group of Pictures with 12 frames, thus resulting altogether in a triple speed search in the forward direction. Jumps therefore take place during the search process from I frame to P frame, from P frame to P frame and from P frame to I frame in the data stream.

For further details relating to the technique as to how trick modes can be implemented for MPEG2-coded video frames, reference should be made to the article "Entwicklung eines DVD-Players: Problem und Lösungen" [Development of the DVD player: problems and solutions] by Ingo Hütter and Dirk Adolph in FKT No. 11/1999, pages 664 et seqq.

Figure 5:
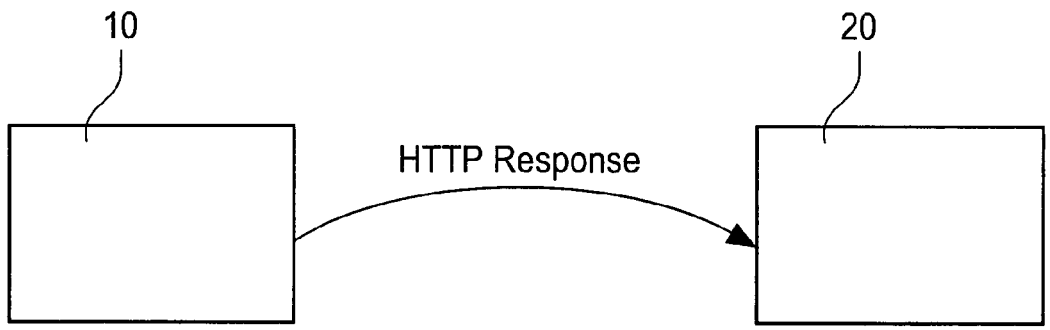
FIG. 5 shows the format of the HTTP-GET response according to the invention.

FIG. 5 shows the format of the HTTP response which is emitted from the source appliance 10 once the fast search has been requested. The status message for a successfully received HTTP-GET request is produced in the first line. This also includes the version details relating to the HTTP method. The date and clock time are stated in the second line of the response.

In the third line, the keyword CONTENT-TYPE is used to signal the data type which will subsequently be transmitted. In the cited example, this is video data, coded using the MPEG2 format. The fourth line is then used to signal that the following transmission will use the chunked transfer encoding mode. The first data section is then transmitted. This is preceded by details of the length of the relevant data section, using hexadecimal digits. Since, as already explained in conjunction with FIG. 4, only the data for the I frames and P frames is transmitted for the search, the video data for an I frame in each case follows here as a data section. The amount of data for one such I frame for a standard video frame is about 120 kbytes. This fluctuates, of course, from one frame content to the next. The respective time details in a transmitted video frame follow on the same line, separated from the length details by a semicolon. The search was requested at the start time 01:02:03:02, see FIG. 2. Starting from this time, the source appliance 10 searched for the next I frame. This was found at the time 01:02:03:04. The time in the fifth line of the HTTP-GET response thus corresponds precisely to this value. The video data for the notified I frame then follows in the next lines. Once this video frame has been transmitted, the length details for the next video frame to be transmitted, together with the appropriate time and the position at which this frame has been located in the video film follow in the next line. This is followed by the associated video data. FIG. 5 then also shows the corresponding details for the third P frame that is jumped to and is then transmitted. The process continues until either the search is ended by the user controller, or the end of the video film is reached. The end of data transmission in the chunked transfer encoding mode is indicated by a line which transmits only the value 0 as the value. This is likewise shown in FIG. 4.

As described, this comprises discontinuous transmission, but in sections, of the video data according to the invention. This is discontinuous because only the video data for individual frames, in this case the I and P frames, is transmitted while, in contrast, the video data for the frames between them is not transmitted.

Since it is perfectly possible for an HTTP request according to the invention to be sent to an appliance which does not support trick modes of the described type, the response from an appliance which does support trick modes should make it clear that the request has been understood and that the data stream will comply with the parameters in the request. This could be achieved by means of a specific HTTP status code in the response (for example "210", "Trick mode OK"), as shown in FIG. 5.

Alternatively, the trick mode parameter may also be repeated in the response, in order to indicate this. The response would then be formed as follows:
HTTP/1.1 200 OK
Date: Fri, 31 Dec. 2003 17:59:59 GMT
Content-Type: video/mpeg
Transfer-Encoding: chunked
AV_SPEED: forward_3
AV_STARTTIME: 01.02.03.04
1EAE0; time=01:02:03:04
.
.
.

The known status code 200 OK is simply used in this response. However, the trick mode parameters are in fact repeated for this purpose, which no standard appliance would do if it could not interpret the trick mode parameters. In the details of the parameter AV_STARTTIME, the time has been made to match the value associated with the first transmitted video frame. This is optional. It is also possible to simply repeat only the time of the request.

Figure 6:
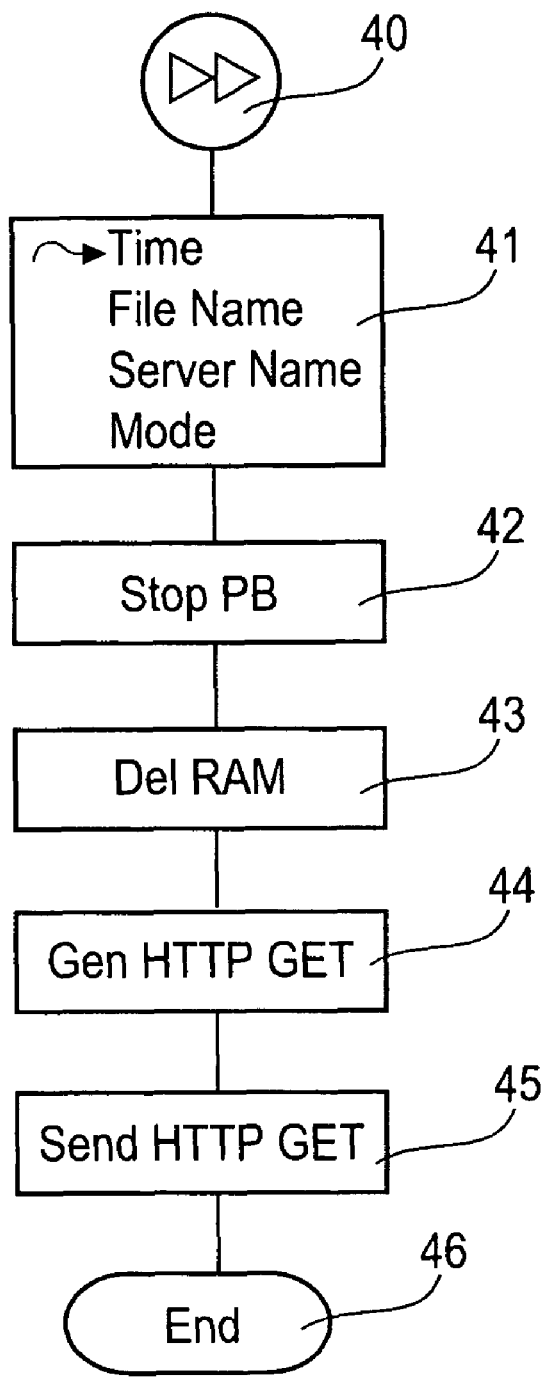
FIG. 6 shows a flowchart for a program, using which the HTTP-GET request is created and is sent to the source appliance.

FIG. 6 shows an example of a flowchart for a program which is processed in the destination appliance 20 once the fast search process has been requested by the user. The program starts with the program step 40, once the operator has operated the forward search button 37. Since a video film has already been played back at normal speed, the required parameters for the search process can also be extracted from the video film that is being played, in the next program step 41. These are firstly the time of the current playing time, the file name of the film being shown, the name of the server on which the video film is stored. A parameter for the new operating mode is also recorded. In a simple case, this parameter may be permanently associated with the operation of the search button 37. This button is then permanently associated with the forward search (three times speed) parameter.

Normal replay of the video film being watched is stopped in the next program step 42. The buffer store 23, which may still contain data for further video frames, is deleted in the next program step 43. This measure means that a dedicated transition takes place from normal replay to search reproduction, to be precise without any major delay time, which may possibly be found to be disturbing.

In the next program step 44, the program creates the necessary HTTP-GET request for the fast search process. FIG. 2 shows the format for the request to be created. This HTTP-GET request is sent to the source appliance 10 in the program step 45. This program section is then ended in the program step 46.

Figure 7:
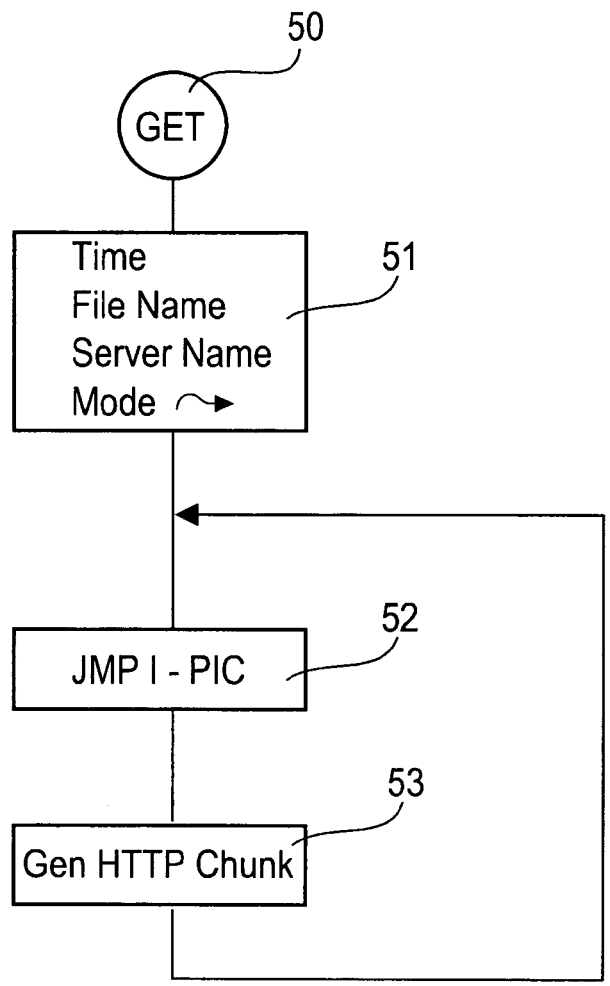
FIG. 7 shows the flowchart of a program which is processed in the source appliance, for creation and transmission of the HTTP-GET response using the chunked transfer encoding mode.

FIG. 7 shows an example of a flowchart for a program which is processed in the source appliance after reception of the described HTTP-GET request. The start of the program is identified by the program step 50. This is initiated by the reception of the previously described HTTP-GET request. The HTTP-GET request that has been received is evaluated in the program step 51. The parameters transmitted in this request, in particular the initial position for the new playback process, the file name, server name and the operating mode, that is to say search at what speed in the forward or reverse direction, are extracted from the HTTP-GET request. The playback that was currently being watched was ended automatically after transmission of the HTTP-GET request by the existing TCP/IP connection, in the program step 42. Starting from the transmitted initial position, the I frame following this is searched for in the next program step 52. The new playback process then starts at the I frame found in this way. The video data read for this purpose is included in an HTTP response message. The format of the HTTP response message is as shown in FIG. 5. The HTTP chunked transfer encoding mode is thus used. This step is identified by the reference number 53 in the program in FIG. 7. Once the video data for the selected I frame has been transmitted, the drive for the source appliance 10 jumps to the location of the next subsequent I frame in the video data file. Separate pointer information items are included in the video data stream for this purpose, in accordance with the MPEG2 Standard. The data for the next I frame is then transmitted as the next item to the destination appliance 20. This process is repeated continuously until either the connection from the destination appliance has been interrupted or until the end of the video film. The endless loop that is shown in FIG. 7 is then terminated.

Figure 8:
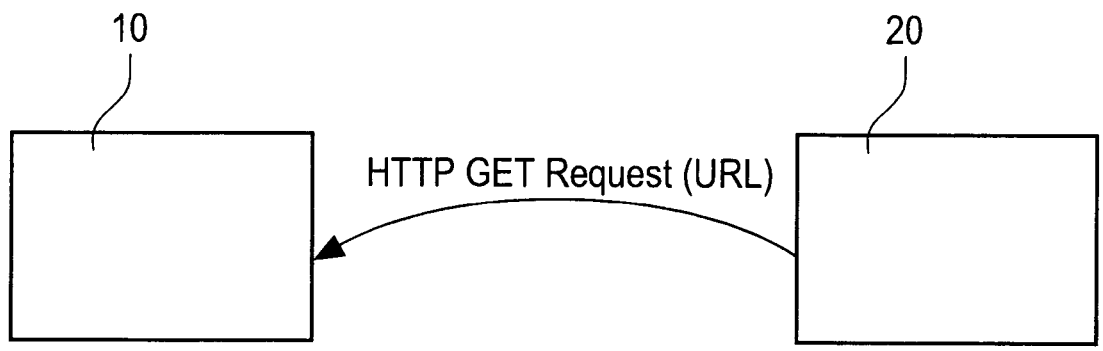
FIG. 8 shows the transmission of an HTTP-GET request from the destination appliance to the source appliance with details of an absolute URL, which is separated by question marks and likewise contains the required parameters for the requested playback process.

An alternative embodiment for an HTTP-GET request according to the invention is illustrated in FIG. 8. According to the invention, the path name shown therein includes not only the file name but also all the other required parameters for the search that is now to be started. The example is designed so as to list all of the required parameters in the path after a question mark. The parameters shown are the file name, the playback speed and direction, and the initial position. The question mark symbol allows dedicated defined parameters to be transmitted separately to the server by means of the & symbol in a URL (Uniform Resource Locator). This method is described in more detail in the Internet Technology RFC 1738 (RFC stands for Request For Comment).

The invention can be used not only for implementation of trick modes (searches) for the transmission of AV data. Searches such as these are also possible with other multimedia data. A file in which the contents of a book are stored is mentioned as one example.

Furthermore, the invention is not just restricted to the application of carrying out a trick mode (search). Typical navigation processes, for example jumping to an indicated position in the document (for example to a position 15 minutes later in the data stream) can thus also be carried out. In this case, the speed details for replay in the HTTP-GET request would indicate normal replay, although the new start position would correspond to the position 15 minutes later in the data stream.

Furthermore, the number and nature of the parameters required may vary, depending on the embodiment. For example, there is no need to always transmit the initial position as a parameter, if a specific initial position is permanently preset. In the case of a short item, it is possible to provide for the forward search to always start from the absolute start position.

What is claimed is:

1. A method for discontinuous transmission, in sections, of encoded video data in a network of distributed appliances, the method comprising the following steps:
   creation of an HTTP GET request for requesting a fast search operation of an original video stream, the request stating a playback speed parameter and an initial position and optionally at least one parameter selected from a group of parameters consisting of file name, file type, path, and playback direction;
   transmission of the HTTP GET request to a source appliance; and
   discontinuous transmission, in sections, of selected video frames of an original encoded video stream from the source appliance to a destination appliance in a HTTP response using an extended HTTP chunked transfer encoding mode, in which the selected encoded video frames for the fast search operation are transported in respective chunks, wherein each chunk includes one complete respective selected encoded video frame in a second part and information about a starting time, as located in the original encoded video stream, of the respective selected video frame in a first part, wherein the second part is different from the first part and the information about a starting time of the respective selected video frame being positioned in a commentary line of the first part.

2. The method of claim 1, wherein a specific status code is returned in the HTTP response, the status code signaling successful interpretation of the parameters in the HTTP GET request.

3. The method of claim 1, wherein the parameters from the HTTP GET request are repeated in the HTTP response as an acknowledgement of successful interpretation of the HTTP GET request.

4. The method of claim 1, wherein the respective selected video frame is transmitted with an indication of data length.

5. The method of claim 4, wherein only intracoded frames and unidirectionally coded frames are transmitted as a data section for an MPEG2 coded video film.

6. The method of claim 1, wherein the network of distributed appliances is a network which is controlled on the basis of an Internet Protocol.

7. The method of claim 6, wherein the network of distributed appliances is designed for control in accordance with a Universal Plug and Play specification.

8. A source appliance for transmitting discontinuous encoded video frames, the source appliance comprising:
   program means for evaluation of a received HTTP GET request from a destination appliance, the HTTP GET request for a fast search operation of a video stream;

program means for generating a response to the HTTP GET request comprising a playback speed parameter and an initial position and optionally at least one parameter selected from a group of parameters consisting of file name, file type, path, and playback direction; and a bus connection for transmitting the response to the destination appliance using an extended HTTP chunked transfer encoding mode, wherein selected video frames from an original encoded video stream are transported in respective chunks, wherein each chunk includes one complete respective selected encoded video frame in a second part and information about a starting time of the respective selected video frame, as located in the original video stream, in a first part, wherein the second part is different from the first part, and the information about a starting time of the respective selected video frame being positioned in a commentary line of the first part.

9. The source appliance of claim 8, wherein the bus connection for transmitting comprises an Ethernet bus for transmission of MPEG video data which, in the course of the extended HTTP chunked transfer encoding, transmit only data for intracoded video frame types and unidirectionally coded video frame types in the MPEG video data as separate data sections.

10. The source appliance of claim 8, wherein the HTTP response further comprises position details, which indicate a position of a data section in the video stream.

11. The source appliance of claim 8, further comprising formatting means which return a specific status code in the response signaling a successful interpretation of the parameters in the HTTP GET request.

12. The source appliance of claim 8, further comprising formatting means which repeat the parameters from the HTTP GET request in the response as an acknowledgement of successful interpretation of the HTTP GET request.

* * * * *